3,833,568
HETEROCYCLIC UREIDOCEPHALOSPORINS

Joseph E. Dolfini, North Brunswick, Jack Bernstein, New Brunswick, and Raymond C. Erickson, Metuchen, N.J., assignors to E. R. Squibb & Sons, Inc., New York, N.Y.
No Drawing. Filed Nov. 27, 1970, Ser. No. 93,490
Int. Cl. C07d 99/24
U.S. Cl. 260—243 C   3 Claims

ABSTRACT OF THE DISCLOSURE

Compounds of the formula $$R-(CH_2)_n-\underset{\underset{\displaystyle NHC-NH_2}{|}}{CH}-\underset{\underset{\displaystyle O}{\|}}{C}-Z$$
$$\phantom{R-(CH_2)_n-CH-C}\overset{\displaystyle O}{\|}$$

wherein R is a furyl, pyridyl, pyrryl, or thienyl radical, or a substituted derivative thereof; $n$ is 0, 1, or 2; and Z is the residue of the 7-ACA or of the 7-ADCA moiety, are effective antibacterial agents.

BACKGROUND OF THE INVENTION

Derivatives of 6-aminopenicillanic acid and of 7-aminocephalosporanic acid are known and have been described as antibacterial agents. There is, however, a continuing need for new antibacterial agents which are effective against additional gram-positive and gram-negative organisms, are effective against resistant organisms or which may be utilized when bacteria develop resistance to known antibacterial agents, or which are particularly effective against certain hard to control organisms.

SUMMARY OF THE INVENTION

This invention relates to new heterocyclic ureidocephalosporins of the general formula $$R-(CH_2)_n-\underset{\underset{\displaystyle NH-C-NH_2}{|}}{CH}-\underset{\underset{\displaystyle O}{\|}}{C}-Z$$

and to carboxylate salts, lower alkyl esters, or acyloxymethyl esters thereof wherein R is furyl, pyridyl, pyrryl, or thienyl;

or halogen, nitro, lower alkyl sulfonyl or aryl sufonyl substituted derivatives of the foregoing heterocycles; $n$ is 0, 1 or 2, and Z is the 7-aminocephalosporanic acid moiety or the 7-aminodesacetoxycephalosporanic acid moiety. The compounds of the present invention are effective antibacterial agents and are useful in the treatment of many gram negative and gram positive infections. These compounds are useful as disinfectants and also as nutritional supplements in animal feeds.

DETAILED DESCRIPTION

The compounds of the present invention may be prepared from a heterocyclic aldehyde of the formula $$R(CH_2)_nCHO \qquad (I)$$

wherein R is furyl, substituted-furyl, pyridyl, substituted-pyridyl, pyrryl, substituted-pyrryl, thienyl, or substituted-thienyl, and $n$ is 0, 1 or 2. The substituents may be halogen, nitro, lower alkyl sulfonyl or aryl sulfonyl, preferably phenyl sulfonyl. The alkyl portion of the lower alkyl sulfonyl substituent may contain from 1 to 4 carbon atoms.

The heterocyclic aldehyde (I) is first converted to an amino acid by known methods, for example, by the well known Strecker amino acid synthesis, Ann 75, 27 (1850); 91, 349 (1954). This method involves the synthesis of α-amino acids by the simultaneous reaction of aldehydes with ammonia and hydrogen cyanide followed by hydrolysis of the resulting amino nitriles. As applied to the heterocyclic aldehydes I of the present invention the reaction is as follows:

$$R(CH_2)_nCHO \xrightarrow[NH_3]{HCN} \left[ R(CH_2)_n\underset{\underset{\displaystyle NH_2}{|}}{CH}CN \right] \longrightarrow$$
$$R(CH_2)_n\underset{\underset{\displaystyle NH_2}{|}}{CH}CO_2H$$

In addition, various well known modifications of the Strecker synthesis may be employed. For example, the Erlenmeyer modification:

$$R(CH_2)_nCHO + NH_3 \longrightarrow$$
$$R(CH_2)_n\underset{\underset{\displaystyle NH_2}{|}}{CH}OH \xrightarrow[2) H_2O/H^+]{1) HNC} R(CH_2)_n\underset{\underset{\displaystyle NH_2}{|}}{CH}CO_2H,$$

the Tiemann modification:

$$R(CH_2)_nCHO + HCN \longrightarrow R(CH_2)_n\underset{\underset{\displaystyle OH}{|}}{CH}CN + \xrightarrow{NH_3}$$
$$R(CH_2)_n\underset{\underset{\displaystyle NH_2}{|}}{CH}CN$$
$$\downarrow H_2O/H^+ \text{ or } OH^-$$
$$R(CH_2)_n\underset{\underset{\displaystyle NH_2}{|}}{CH}CO_2H$$

the Zelinsky-Stadnikoff modification:

$$R(CH_2)_nCHO + NH_4Cl + KCN \longrightarrow R(CH_2)_n\underset{\underset{\displaystyle NH_2}{|}}{CH}CN$$
$$\downarrow H_2O/H^+$$
$$R(CH_2)_n\underset{\underset{\displaystyle NH_2}{|}}{CH}CO_2H$$

and the Bucherer modification:

$$R(CH_2)_nCHO \xrightarrow[(2) NH_3]{(1) HCN} R(CH_2)_n\underset{\underset{\displaystyle NH_2}{|}}{CH}CN \xrightarrow{(NH_4)_2CO_3}$$
$$\begin{array}{c}R(CH_2)_nCH-NH\\ | \quad\quad\quad \backslash\\ \quad\quad\quad\quad C=O\\ | \quad\quad\quad /\\ CO-NH\end{array} \downarrow H_2O/H^+$$
$$R(CH_2)_n\underset{\underset{\displaystyle NH_2}{|}}{CH}CO_2H$$

The amino acid of the formula $$R(CH_2)_n-\underset{\underset{\displaystyle NH_2}{|}}{CH}-CO_2H \qquad (II)$$

produced by any suitable method, for example, those described above, is then reacted with an alkali metal cyanate or an alkaline earth metal cyanate to form an α-ureido compound of the formula $$\underset{\underset{R(CH_2)_n-CH-CO_2H}{|}}{NH-\overset{O}{\overset{\|}{C}}-NH_2} \quad (III)$$

This reaction takes place by treating an aqueous suspension of the α-amino acid with the alkali or alkaline earth metal cyanate. Acidification with hydrochloric acid precipitates the α-ureido acid in good yield. A solution of the α-ureido acid in an organic solvent containing a tri-(lower)alkyl amine is converted to a mixed carbonic or other anhydride (IV) by treating with an anhydride forming reagent, e.g., a lower alkyl chloroformate, an aryl chloroformate, or an acyl halide, at reduced temperatures of from about 0° C. to about −20° C.

Reaction at reduced temperatures of the mixed anhydride (IV) with 7-aminocephalosporanic acid (7-ACA) or 7-aminodesacetoxycephalosporanic acid (7-ADCA) yields the compounds of the present invention. The product is precipitated by acidification.

Alternatively, a compound of formula V may be obtained by converting a compound of formula III to an activated ester or by reacting a compound of formula III with a carboxyl group activating agent, such as, for example, dicyclohexylcarbodiimide or bisimidazole carbonyl, and then coupling the activated form of the compound of formula III with 7-ACA or 7-ADCA. In some cases, as will be obvious to those skilled in the art, the carboxyl group may be activated by conversion to an acid halide, e.g. the chloride, or to an azide prior to coupling with 7-ACA or 7-ADCA. A more detailed discussion of carboxyl activating groups may be obtained by reference to standard works on peptide synthesis, for example, Bodanszky et al., "Peptide Synthesis," Interscience, 1966.

Alternatively, the α-amino acid (II) produced, for example, by subjecting a heterocyclic aldehyde to the Strecker reaction or a modification thereof, may be used to acylate 7-ACA or 7-ADCA. The resutling α-amino acid derivative of 7-ACA or 7-ADCA (VI) is then reacted with an alkali metal cyanate or an alkaline earth metal cyanate in the presence of water to form the compounds (V) of the present invention, The α-amino acid (II) or the α-ureido acid (III) obtained occurs as a racemate of d and l optical isomers. It is generally possible to resolve these compounds by using optically pure bases (or acids) using methods known to the art, for example, as described by L. Velluz, "Substances Naturelle de Synthesese," 9, pp 119–174 (1954), or E. L. Eliel, "Stereochemistry of Carbon Compounds," Chapter 4, McGraw-Hill Book Co., N. Y. (1962). The resulting pure d or l acid may then be coupled to the 7-ACA or 7-ADCA moiety. Generally the coupling of the d form leads to the more active product.

When preparing compounds of the present invention according to the reaction sequence wherein an α-amino acid is acylated with 7-ACA or 7-ADCA, it may be desirable to protect the α-amino group during the acylation reaction by means of an amino protecting group. Such amino protecting groups are well known in the art and are described, for example, by Bodanszky et al., "Peptide Synthesis," supra.

Specific examples of methods for acylating 7-ACA or 7-ADCA are described, for example, in Netherlands Pat. 6,812,382, Belgian Pat. 675,298, as well as in the following articles:

Spencer et al., J. Med. Chem., 9, 746 (1966); Ryan et al., ibid. 12, 310 (1969).

A general reaction scheme for preparing compounds of the present invention is shown below wherein R is as defined previously and Z is the residue of 7-ACA or 7-ADCA:

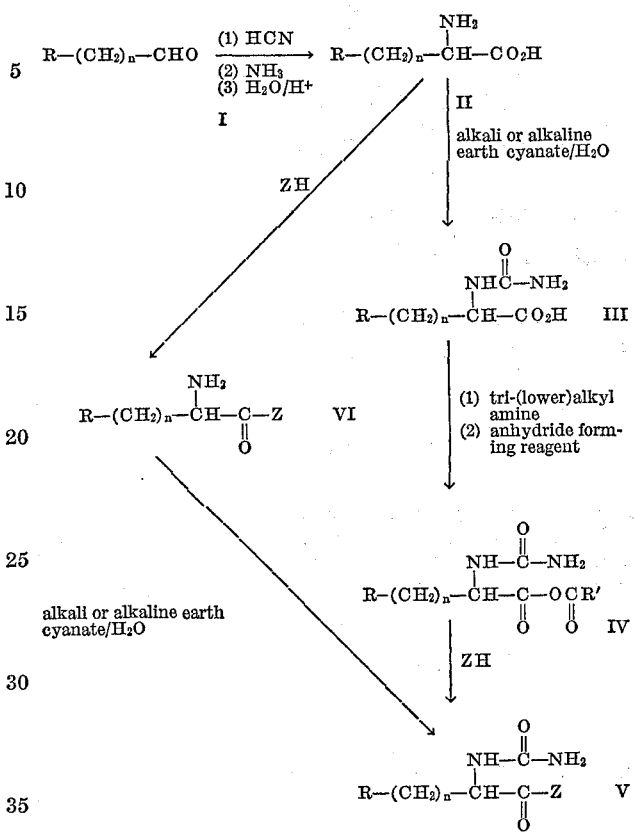

The carboxylate salts of the compounds (V) of the present invention are formed by reacting the carboxyl group of the 7-ACA or 7-ADCA moiety with a salt-forming ion, e.g., an alkali metal such as sodium or potassium, or an alkaline earth metal such as magnesium or calcium, or a metal of group IIIA such as aluminum, or the radical of an organic base such as dibenzylamine, N,N-dibenzylethylenediamine or other organic bases known to form salts with cephalosporanic acids.

The lower alkyl esters may be obtained by esterifying the carboxyl group of the 7-ACA or 7-ADCA moiety with a straight or branched chain lower alkyl halide of from 1 to 7 carbon atoms. The resulting ester group is then formed by a radical such as methyl, ethyl, propyl, isopropyl, butyl, isobutyl, t-butyl, pentyl, neopentyl, hexyl, 2-methylhexyl, heptyl, and the like.

The acyloxymethyl esters may be obtained according to known methods, for example a method adapted from that of Daehne et al., J. Med. Chem. 13, 607 (1970), by reacting the carboxyl group or a metal salt thereof of the 7-ACA or 7-ADCA moiety with a halide of the formula $$X-CH_2-O-\overset{O}{\overset{\|}{C}}-R^1$$

wherein R' may be lower alkyl of up to 5 carbon atoms, phenyl or phenyl lower alkyl, and X is chlorine or bromine. Thus, suitable compounds include acetoxymethyl chloride, propionyloxymethyl chloride, butyryloxymethyl chloride, pivaloyloxymethyl chloride, valeryloxymethyl chloride, benzyloxymethyl chloride, or phenacetoxymethyl chloride, and the like.

It will be appreciated that certain of the compounds of this invention exist in various states of solvation as well as in different optically active forms. The various forms as well as their mixtures are within the scope of this invention.

The compounds of this inventon have a broad spectrum of antibacterial activity against both gram positive and gram negative organisms such as *Staphylococcus aureus, Salmonella schottmuelleri, Proteus vulgaris, Escherichia coli* and *Streptococcus pyogenes*. They may be used as antibacterial agents in a prophylactic manner, e.g., in cleaning or disinfecting compositions, or otherwise to combat infections due to organisms such as those named above, and in general may be utilized in a manner similar to cephalosporin C, cephalothin and other cephalosporins. For example, a compound of formula I or a physiologically acceptable salt thereof may be used in various animal species in an amount of about 1 to 200 mg./kg. daily, orally or parenterally, in single or two to four divided doses to treat infections of bacterial origin.

Up to about 600 mg. of a compound of formula I or a salt thereof may be incorporated in an oral dosage form such as tablets, capsules or elixirs or in an injectable form in a sterile aqueous vehicle prepared according to conventional pharmaceutical practice.

In cleaning or disinfecting compositions, e.g., in barns or dairy equipment, a concentration of about 0.01 to 1% by weight of such compounds admixed with, suspended or dissolved in conventional inert dry or aqueous carriers for application by washing or spraying may be used.

They are also useful as nutritional supplements in animal feeds.

The following examples illustrate the invention without, however, limiting the same thereto. All temperatures shown are in degrees centigrade.

EXAMPLE 1

7-[2-Ureido-2-(2-furyl)acetamido]cephalosporanic acid

Furfural is reacted with ammonium cyanide prepared *in situ* from ammonium chloride and sodium cyanide. The resulting amino nitrile is hydrolyzed to yield furyl-2-(2-amino)acetic acid. A suspension of the latter compound (0.10 moles) in 150 ml. of water is treated with 8.1 g. of potassium cyanate. The resulting mixture is heated to about 80° C. to give a clear solution which is then allowed to stand at room temperature for about 24 hours. Acidification to pH 3.5–5 with hydrochloric acid precipitates the α-ureido compound. A solution containing 0.10 moles of the α-ureido acid in 100 ml. of acetone containing 10.1 g. of triethylamine at a temperature of from about 0° C. to about −20° C. is converted to a mixed carbonic anhydride by treating with 10.8 g. of ethyl chloroformate for about 30 minutes. A cold (about −10° C.) solution of 27.2 g. of 7-aminocephalosporanic acid in 400 ml. of 1:1 acetone-water containing 10.1 g. of triethylamine is added to the solution of mixed anhydride and the reaction mixture stirred vigorously at about 0° C. for approximately 30–45 minutes. The volume of the solution is reduced by evaporating the bulk of the acetone at reduced pressure at room temperature or below. Acidification precipitates the title compound.

EXAMPLES 2–44

Following the procedure of Example 1 but substituting for furfural an equivalent amount of the heterocyclic aldehyde indicated in column I, there is obtained the heterocyclic ureidocephalosporin indicated in column II.

| Example | I | II |
|---|---|---|
| 2 | 2-pyrrolecarboxaldehyde. | 7-[2-ureido-2-(2-pyrryl)-acetamido]cephalosporanic acid. |
| 3 | 4-chloro-2-pyrrolecarboxaldehyde. | 7-[2-ureido-2-(4-chloro-2-pyrryl)acetamido]cephalosporanic acid. |
| 4 | 5-chloro-2-pyrrolecarboxaldehyde. | 7-[2-ureido-2-(5-chloro-2-pyrryl)acetamido]cephalosporanic acid. |
| 5 | 4-bromo-2-pyrrolecarboxaldehyde. | 7-[2-ureido-2-(4-bromo-2-pyrryl)acetamido]cephalosporanic acid. |
| 6 | 5-bromo-2-pyrrolecarboxaldehyde. | 7-[2-ureido-2-(5-bromo-2-pyrryl)acetamido]cephalosporanic acid. |
| 7 | 4-nitro-2-pyrrolecarboxaldehyde. | 7-[2-ureido-2-(4-nitro-2-pyrryl)acetamido]cephalosporanic acid. |
| 8 | 5-nitro-2-pyrrolecarboxaldehyde. | 7-[2-ureido-2-(5-nitro-2-pyrryl)acetamido]cephalosporanic acid. |
| 9 | 3-pyrrolecarboxaldehyde. | 7-[2-ureido-2-(3-pyrryl)-acetamido]cephalosporanic acid. |
| 10 | 5-chloro-2-furaldehyde. | 7-[2-ureido-2-(5-chloro-2-furyl)acetamido]cephalosporanic acid. |
| 11 | 5-bromo-2-furaldehyde. | 7-[2-ureido-2-(5-bromo-2-furyl)acetamido]cephalosporanic acid. |
| 12 | 5-iodo-2-furaldehyde. | 7-[2-ureido-2-(5-iodo-2-furyl)acetamido]cephalosporanic acid. |
| 13 | 4,5-dibromo-2-furaldehyde. | 7-[2-ureido-2-(4,5-dibromo-2-furyl)acetamido]cephalosporanic acid. |
| 14 | 5-nitro-2-furaldehyde. | 7-[2-ureido-2-(5-nitro-2-furyl)acetamido]cephalosporanic acid. |
| 15 | 5-methylsulfonyl-2-furaldehyde. | 7-[2-ureido-2-(5-methylsulfonyl-2-furyl)acetamido]cephalosporanic acid. |
| 16 | 5-phenylsulfonyl-2-furaldehyde. | 7-[2-ureido-2-(5-phenylsulfonyl-2-furyl)acetamido]cephalosporanic acid. |
| 17 | 3-furaldehyde. | 7-[2-ureido-2-(3-furyl)-acetamido]cephalosporanic acid. |
| 18 | 4-chloro-3-furaldehyde. | 7-[2-ureido-2-(4-chloro-3-furyl)-acetamido]cephalosporanic acid. |
| 19 | 2-pyridylcarboxaldehyde. | 7-[2-ureido-2-(2-pyridyl)-acetamido]cephalosporanic acid. |
| 20 | 4-chloro-2-pyridylcarboxaldehyde. | 7-[2-ureido-2-(4-chloro-2-pyridyl)-acetamido]cephalosporanic acid. |
| 21 | 3-pyridylcarboxaldehyde. | 7-[2-ureido-2-(3-pyridyl)acetamido]cephalosporanic acid. |
| 22 | 4-chloro-3-pyridylcarboxaldehyde. | 7-[2-ureido-2-(4-chloro-3-pyridyl)-acetamido]cephalosporanic acid. |
| 23 | 5-chloro-3-pyridylcarboxaldehyde. | 7-[2-ureido-2-(5-chloro-3-pyridyl)-acetamido]cephalosporanic acid. |
| 24 | 5-bromo-3-pyridylcarboxaldehyde. | 7-[2-ureido-2-(5-bromo-3-pyridyl)-acetamido]cephalosporanic acid. |
| 25 | 4-pyridylcarboxaldehyde. | 7-[2-ureido-2-(4-pyridyl)-acetamido]cephalosporanic acid. |
| 26 | 2-thiophenecarboxaldehyde. | 7-[2-ureido-2-(2-thiophen)-acetamido]cephalosporanic acid. |
| 27 | 3-chloro-2-thiophenecarboxaldehyde. | 7-[2-ureido-2-(3-chloro-2-thiophene)acetamido]cephalosporanic acid. |
| 28 | 5-chloro-2-thiophenecarboxaldehyde. | 7-[2-ureido-2-(5-chloro-2-thiophene)acetamido]cephalosporanic acid. |
| 29 | 3-bromo-2-thiophenecarboxaldehyde. | 7-[2-ureido-2-(3-bromo-2-thiophene)acetamido]cephalosporanic acid. |
| 30 | 4-bromo-2-thiophenecarboxaldehyde. | 7-[2-ureido-2-(4-bromo-2-thiophene)acetamido]cephalosporanic acid. |
| 31 | 5-bromo-2-thiophenecarboxaldehyde. | 7-[2-ureido-2-(5-bromo-2-thiophene)acetamido]cephalosporanic acid. |
| 32 | 3-nitro-2-thiophenecarboxaldehyde. | 7-[2-ureido-2-(3-nitro-2-thiophene)-acetamido]cephalosporanic acid. |
| 33 | 4-nitro-2-thiophenecarboxaldehyde. | 7-[2-ureido-2-(4-nitro-2-thiophene)-acetamido]cephalosporanic acid. |
| 34 | 5-nitro-2-thiophenecarboxaldehyde. | 7-[2-ureido-2-(5-nitro-2-thiophene)-acetamido]cephalosporanic acid. |
| 35 | 3-thiophenecarboxaldehyde. | 7-[2-ureido-2-(3-thiophen)-acetamido]cephalosporanic acid. |
| 36 | 2-bromo-3-thiophenecarboxaldehyde. | 7-[2-ureido-2-(2-bromo-3-thiophene)acetamido]cephalosporanic acid. |
| 37 | 4-bromo-3-thiophenecarboxaldehyde. | 7-[2-ureido-2-(4-bromo-3-thiophene)acetamido]cephalosporanic acid. |
| 38 | 2,5-dibromo-3-thiophenecarboxaldehyde. | 7-[2-ureido-2-(2,5-dibromo-3-thiophene)acetamido]cephalosporanic acid. |
| 39 | 5-nitro-3-thiophenecarboxaldehyde. | 7-[2-ureido-2-(5-nitro-3-thiophene)-acetamido]cephalosporanic acid. |
| 40 | 2-methylsulfonyl-3-thiophenecarboxaldehyde. | 7-[2-ureido-2-(2-methylsulfonyl-3-thiophene)acetamido]cephalosporanic acid. |
| 41 | 2-pyridine-2-acetaldehyde. | 7-[2-ureido-3-(2-pyridyl)-propionamido]cephalosporanic acid. |
| 42 | 2-pyrryl-2-acetaldehyde. | 7-[2-ureido-3-(2-pyrryl))-propionamido]cephalosporanic acid. |
| 43 | 3-thiophene-2-acetaldehyde. | 7-[2-ureido-3-(3-thiophen)-propionamido]cephalosporanic acid. |
| 44 | 3-furyl-2-acetaldehyde. | 7-[2-ureido-3-(3-furyl)-propionamido]cephalosporanic acid. |

EXAMPLE 45

7-[2-Ureido-2(2-furyl)acetamido]desacetoxycephalosporanic acid

The title product is prepared following the procedure of Example 1 except that there is employed 7-aminodesacetoxycephalosporanic acid (21.4 g.) in place of the 7-aminocephalosporanic acid.

EXAMPLES 46–89

Following the procedure of Example 45 but substituting for furfural an equivalent amount of the heterocyclic aldehyde indicated in column I, there is obtained the heterocyclic ureidodesacetoxy cephalosporin indicated in column II.

| Example | Heterocyclic aldehyde of example II | |
|---|---|---|
| 46 | 1 | 7-2-ureido-2-(2-furyl)acetamido] desacetoxycephalosporanic acid. |
| 47 | 2 | 7-[2-ureido-2-(2-pyrryl)acetamido] desacetoxycephalosporanic acid. |
| 48 | 3 | 7-[2-ureido-2-(4-chloro-2-pyrryl)-acetamido] desacetoxycephalosporanic acid. |
| 49 | 4 | 7-[2-ureido-2-(5-chloro-2-pyrryl)-acetamido] desacetoxycephalosporanic acid. |
| 50 | 5 | 7-[2-ureido-2-(4-bromo-2-pyrryl)-acetamido] desacetoxycephalosporanic acid. |
| 51 | 6 | 7-[2-ureido-2-(5-bromo-2-pyrryl)-acetamido] desacetoxycephalosporanic acid. |
| 52 | 7 | 7-[2-ureido-2-(4-nitro-2-pyrryl)-acetamido] desacetoxycephalosporanic acid. |
| 53 | 8 | 7-[2-ureido-2-(5-nitro-2-pyrryl)-acetamido] desacetoxycephalosporanic acid. |
| 54 | 9 | 7-[2-ureido-2-(3-pyrryl)acetamido] desacetoxycephalsporanic acid. |
| 55 | 10 | 7-[2-ureido-2-(5-chloro-2-furyl)-acetamido] desacetoxycephalosporanic acid. |
| 56 | 11 | 7-[2-ureido-2-(5-bromo-2-furyl)-acetamido] desacetoxycephalosporanic acid. |
| 57 | 12 | 7-[2-ureido-2-(5-iodo-2-furyl))-acetamido]desacetoxycephalosporanic acid. |
| 58 | 13 | 7-[2-ureido-2-(4,5-dibromo-2-furyl)-acetamido] desacetoxycephalosporanic acid. |
| 59 | 14 | 7-[2-ureido-2-(5-nitro-2-furyl)-acetamido]desacetoxycephalosporanic acid. |
| 60 | 15 | 7-[2-ureido-2-(5-methylsulfonyl-2-furyl)acetamido]desacetoxycephalosporanic acid. |
| 61 | 16 | 7-[2-ureido-2-(5-phenylsulfonyl-2-furyl)acetamido]desacetoxycephalosporanic acid. |
| 62 | 17 | 7-[2-ureido-2-(3-furyl)acetamido]-desacetoxycephalosporanic acid. |
| 63 | 18 | 7-[2-ureido-2-(4-chloro-3-furyl)-acetamido]desacetoxycephalosporanic acid. |
| 64 | 19 | 7-[2-ureido-2-(2-pyridyl)acetamido]desacetoxycephalosporanic acid. |
| 65 | 20 | 7-[2-ureido-2-(4-chloro-2-pyridyl)-acetamido]desacetoxycephalosporanic acid. |
| 66 | 21 | 7-[2-ureido-2-(3-pyridyl)acetamido]desacetoxycephalosporanic acid. |
| 67 | 22 | 7-[2-ureido-2-(4-chloro-3-pyridyl)acetamido]desacetoxycephalosporanic acid. |
| 68 | 23 | 7-[2-ureido-2-(5-chloro-3-pyridyl)acetamido]desacetoxycephalosporanic acid. |
| 69 | 24 | 7-[2-ureido-2-(5-bromo-3-pyridyl)-acetamido]desacetoxycephalosporanic acid. |
| 70 | 25 | 7-[2-ureido-2-(4-pyridyl)acetamido]desacetoxycephalosporanic acid. |
| 71 | 26 | 7-[2-ureido-2-(2-thiophen)acetamido]desacetoxycephalosporanic acid. |
| 72 | 27 | 7-[2-ureido-2-(3-chloro-2-thiophene)acetamido]desacetoxycephalosporanic acid. |
| 73 | 28 | 7-[2-ureido-2-(5-chloro-2-thiophene)acetamido]desacetoxycephalosporanic acid. |
| 74 | 29 | 7-[2-ureido-2-(3-bromo-2-thiophene)acetamido]desacetoxycephalosporanic acid. |
| 75 | 30 | 7-[2-ureido-2-(4-bromo-2-thiophene)-acetamido]desacetoxycephalosporanic acid. |
| 76 | 31 | 7-[2-ureido-2-(5-bromo-2-thiophene)-acetamido]desacetoxycephalosporanic acid. |
| 77 | 32 | 7-[2-ureido-2-(3-nitro-2-thiophene)-acetamido]desacetoxycephalosporanic acid. |
| 78 | 33 | 7-[2-ureido-2-(4-nitro-2-thiophene)-acetamido]desacetoxycephalosporanic acid. |
| 79 | 34 | 7-[2-ureido-2-(5-nitro-2-thiophene)-acetamido]desacetoxycephalosporanic acid. |
| 80 | 35 | 7-[2-ureido-2-(3-thiophen)acetamido]-desacetoxycephalosporanic acid. |
| 81 | 36 | 7-[2-ureido-2-(2-bromo-3-thiophene)-acetamido]desacetoxycephalosporanic acid. |
| 82 | 37 | 7-[2-ureido-2-(4-bromo-3-thiophene)-acetamido]desacetoxycephalosporanic acid. |
| 83 | 38 | 7-[2-ureido-2-(2,5-dibromo-3-thiophene)acetamido]desacetoxycephalosporanic acid. |
| 84 | 39 | 7-[2-ureido-2-(5-nitro-3-thiophene)-acetamido]desacetoxycephalosporanic acid. |
| 85 | 40 | 7-[2-ureido-2-(2-methylsulfonyl-3-thiophene)-acetamido]desacetoxycephalosporanic acid. |
| 86 | 41 | 7-[2-ureido-3-(2-pyridyl)propionamido]-desacetoxycephalosporanic acid. |
| 87 | 42 | 7-[2-ureido-3-(2-pyrryl)propionamido]desacetoxycephalosporanic acid |
| 88 | 43 | 7-[2-ureido-3-(3-thiophen)propionamido]desacetoxycephalosporanic acid. |
| 89 | 44 | 7-[2-ureido-3-(3-furyl)propionamido]-cephalosporanic acid. |

EXAMPLE 90

A sterile powder for reconstitution for use intramuscularly is prepared from the following ingredients which supply 1000 vials each containing 250 mg. of active ingredient:

7-[2-ureido-2-(2-furyl)acetamido]-cephalo-
  sporanic acid, Na salt, sterile _____mg\_\_\_\_ 250
Lecithin powder, sterile _____gm\_\_\_\_ 50
Sodium carboxymethylcellulose, sterile \_\_\_\_\_gm\_\_\_\_ 20

The sterile powders are aseptically blended, subdivided, filled into sterile vials and sealed. The addition of 1 ml. of water for injection to the vial provides a suspension for intramuscular injection.

EXAMPLE 91

The following ingredients are admixed:
                                                          Gm.
7-[ureido-2-(2 - pyrryl)acetamido]-cephalosporanic
  acid _____ 250
Lactose _____ 56.9
Magnesium stearate _____ 3.1

The mixed ingredients are subdivided and filled into 1000 No. 2 gelatin capsules each containing a total of 310 mg. with 250 mg. of active substance.

EXAMPLE 92

Tablets are prepared from the following ingredients:

7 - [2 -ureido - 2 - (4 - chloro - 2 - pyridyl) - acetamido]cephalosporanic acid _____kg\_\_ 5
Polyvinyl pyrolidone _____gm\_\_ 360
Lactose _____gm\_\_ 780
Talc _____gm\_\_ 80
Magnesium stearate _____gm\_\_ 80

The active substance is mixed with the lactose and granulated with an ethanol solution of the polyvinyl pyrrolidone. The wet material is screened, then dried at 45°. The dried material is screened and admixed with the talc and magnesium stearate. The mixture is compressed in a tableting machine to obtain 10,000 tablets weighing a total of 630 mg. each and containing 500 mg. of active ingredient.

EXAMPLE 93

Pivalolyloxymethyl ester of 7-[2-ureido-2-
(2-furyl)acetamido]cephalosporanic acid Chloromethylpivalate (20 mmole) is combined with 10 mmol. of the product from Example 1, 0.4 ml. of a 5% aqueous sodium iodide solution, and 170 ml. of acetone. Triethylamine, 2.0 gm. (20 mmol.), is added and the mixture stirred for 10 hours, then refluxed for one hour. The reaction mixture is cooled and concentrated *in vacuo*. The residue is partitioned between ethyl acetate, and 5% aqueous sodium bicarbonate. The organic layer is dried over sodium sulfate and evaporated to give the crude product which is obtained as a powder upon trituration with ether.

EXAMPLE 94

7-[2-Ureido-2-(2-furyl)acetamido]desacetoxycephalosporanic acid, pivaloyloxymethyl ester The title compound is prepared following the procedure of Example 93 except substituting an equivalent amount of 7-ADCA for 7-ACA.

EXAMPLE 95

7-[2-Ureido-2-(2-furyl)acetamido]
cephalosporanic acid, methyl ester

A 0.1 molar solution of the compound of Example 1 in dimethoxyethane is treated with an excess of ethereal diazomethane. Evaporation of the solvent at reduced pressure deposits the title compound.

EXAMPLE 96

7-[2-Ureido-2-(2-pyrryl)acetamido]
cephalosporanic acid, methyl ester

The title compound is prepared by following the procedure of Example 95 but substituting for the cephalosporanic acid of that example the final product of Example 2.

EXAMPLE 97

7-[2-Ureido-2-(2-pyridyl)acetamido]cephalosporanic acid, methyl ester

The title compound is prepared by following the procedure of Example 95 but substituting for the cephalosporanic acid of that example the final product of Example 19.

EXAMPLE 98

7-[2-Ureido-2-(2-thiophen)acetamido]cephalosporanic acid, methyl ester

The title compound is prepared by following the procedure of Example 95 but substituting for the cephalosporanic acid of that example the final product of Example 26.

EXAMPLE 99

7-[2-Ureido-2-(2-furyl)acetamido]desacetoxy-cephalosporanic acid, methyl ester

The title compound is prepared by following the procedure of Example 95 but substituting for the cephalosporanic acid of that example the final product of Example 45.

EXAMPLE 100

7-[2-Ureido-2-(4-chloro-2-pyrryl)acetamido]desacetoxycephalosporanic acid, methyl ester The title compound is prepared by following the procedure of Example 95 but substituting for the cephalosporanic acid of that example the final product of Example 48.

EXAMPLE 101

7-[2-Ureido-2-(3-pyrryl)acetamido]desacetoxy-cephalosporanic acid, methyl ester

The title compound is prepared by following the procedure of Example 95 but substituting for the cephalosporanic acid of that example the final product of Example 54.

EXAMPLE 102

7-[2-Ureido-2-(thiophen)acetamido]desacetoxy-cephalosporanic acid, methyl ester

The title compound is prepared by following the procedure of Example 95 but substituting for the cephalosporanic acid of that example the final product of Example 71.

What is claimed is:

1. A compound of the formula

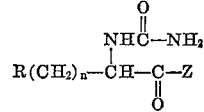

wherein R is thienyl or substituted thienyl wherein the substituent is halogen, nitro, phenylsulfonyl, or lower alkylsulfonyl wherein the alkyl group has 1 to 4 carbon atoms; $n$ is 0, 1 or 2, and Z is the 7-aminocephalosporanic acid group or the 7-aminodesacetoxycephalosporanic acid group, or a pharmaceutically acceptable salt thereof, or alkyl ester thereof wherein the alkyl group has from 1 to 7 carbon atoms, or alkanoyloxymethyl ester thereof wherein the alkanoyl group has up to 5 carbon atoms, or benzoyl or phenacetyl.

2. A compound of claim 1 wherein $n$ is 0.

3. A compound of claim 1 having the name 7-[2-ureido-2-(2-thiophen)-acetamido]cephalosporanic acid.

References Cited

UNITED STATES PATENTS

| 3,485,819 | 12/1969 | Weissenburn et al. | 260—243 C |
|---|---|---|---|
| 3,518,260 | 6/1970 | Spencer et al. | 260—243 C |
| 3,673,183 | 6/1972 | Erickson | 260—243 C |
| 3,641,021 | 2/1972 | Ryan | 260—243 C |

NICHOLAS S. RIZZO, Primary Examiner

U.S. Cl. X.R.

424—246

PO-1050
(5/69)

UNITED STATES PATENT OFFICE
CERTIFICATE OF CORRECTION

Patent No. 3,833,568        Dated September 10, 1974

Inventor(s) Joseph E. Dolfini et al.

It is certified that error appears in the above-identified patent and that said Letters Patent are hereby corrected as shown below:

Column 2, line 9, "(1954)" should read --(1854)--.

Column 2, line 29, in the formula, "1)HNC" should read --1)HCN--.

Column 8, line 21, "pyrolidone" should read --pyrrolidone--.

Column 10, line 2, "(thiophen)" should read --(2-thiophen)--.

Signed and sealed this 19th day of November 1974.

(SEAL)
Attest:

McCOY M. GIBSON JR.        C. MARSHALL DANN
Attesting Officer        Commissioner of Patents